United States Patent
Swaminathan et al.

(10) Patent No.: US 12,468,788 B2
(45) Date of Patent: Nov. 11, 2025

(54) ENABLING A PASSWORD-BASED MODE OF AUTHENTICATION THROUGH A NON-DIGITAL AUTHENTICATION CHANNEL

(71) Applicant: Truist Bank, Charlotte, NC (US)

(72) Inventors: Sudhakar Swaminathan, Duluth, GA (US); Madhusudan Panda, Cary, NC (US)

(73) Assignee: Truist Bank, Charlotte, NC (US)

( * ) Notice: Subject to any disclaimer, the term of this patent is extended or adjusted under 35 U.S.C. 154(b) by 611 days.

(21) Appl. No.: 17/843,517

(22) Filed: Jun. 17, 2022

(65) Prior Publication Data

US 2023/0409681 A1 Dec. 21, 2023

(51) Int. Cl.
*G06F 21/31* (2013.01)
*H04L 9/40* (2022.01)

(52) U.S. Cl.
CPC .............. *G06F 21/31* (2013.01); *H04L 63/18* (2013.01)

(58) Field of Classification Search
CPC ................................. G06F 21/31; H04L 63/18
See application file for complete search history.

(56) References Cited

U.S. PATENT DOCUMENTS

| | | | |
|---|---|---|---|
| 10,117,098 B1 * | 10/2018 | Naguthanawala | H04L 63/18 |
| 10,728,044 B1 | 7/2020 | Melo et al. | |
| 11,853,933 B1 * | 12/2023 | Coles | G06N 5/04 |
| 2007/0157019 A1 | 7/2007 | York | |
| 2013/0159699 A1 * | 6/2013 | Torkkel | H04L 9/0897 726/3 |
| 2014/0165171 A1 * | 6/2014 | Meng | G06F 21/31 726/7 |
| 2016/0269398 A1 | 9/2016 | Chhabra et al. | |
| 2016/0275272 A1 * | 9/2016 | Koshinuma | G06F 21/31 |
| 2017/0187701 A1 * | 6/2017 | Bonnell | H04L 63/107 |
| 2018/0018453 A1 * | 1/2018 | Malpani | H04L 9/3234 |
| 2019/0080072 A1 | 3/2019 | Van Os et al. | |

(Continued)

OTHER PUBLICATIONS

U.S. Appl. No. 17/843,344, Non-Final Office Action, Mailed On Jul. 5, 2024, 15 pages.

(Continued)

*Primary Examiner* — Abdulkader M Alriyashi
(74) *Attorney, Agent, or Firm* — Kilpatrick Townsend & Stockton LLP; Michael A. Springs, Esq.

(57) ABSTRACT

A system can prevent access to a user account via a password-based mode of authentication The system can receive a request from a non-digital authentication channel to enable the password-based mode of authentication to access the user account. The non-digital authentication channel can include an in-network system at a physical location associated with an entity managing the user account. The request can include an authenticated credential associated with the physical location and a verification associated with a user of the user account. The system can confirm the verification and the authenticated credential received in the request. The system can, in response to confirming the verification and the authenticated credential, change a setting in a database associated with the user account to enable the password-based mode of authentication associated with the user account for providing a user device with password-based access to the user account.

18 Claims, 3 Drawing Sheets

(56) References Cited

U.S. PATENT DOCUMENTS

| | | |
|---|---|---|
| 2019/0139009 A1 | 5/2019 | Ikeuchi |
| 2020/0327219 A1 | 10/2020 | Bolimovsky |
| 2021/0135862 A1* | 5/2021 | Morales .................... H04L 9/50 |
| 2021/0217022 A1 | 7/2021 | Loucks et al. |
| 2022/0201008 A1 | 6/2022 | Stergioudis |
| 2023/0028416 A1* | 1/2023 | Mason ................ H04L 63/0838 |

OTHER PUBLICATIONS

U.S. Appl. No. 17/843,344 , Notice of Allowance, Mailed On Oct. 9, 2024, 6 pages.

* cited by examiner

ENABLING A PASSWORD-BASED MODE OF AUTHENTICATION THROUGH A NON-DIGITAL AUTHENTICATION CHANNEL

CROSS REFERENCE TO RELATED APPLICATION

This is related to, and claims priority to, U.S. application Ser. No. 17/843,344, filed Jun. 17, 2022 and titled DISABLING A PASSWORD-BASED MODE OF AUTHENTICATION AND ENABLING A PASSWORD-LESS MODE OF AUTHENTICATION, the entirety of which is incorporated herein by reference.

TECHNICAL FIELD

The present disclosure relates to computer network technology and, more particularly (although not necessarily exclusively), to enabling a password-based mode of authentication associated with a user account in response to a request made through a non-digital authentication channel.

BACKGROUND

In some cases, a server can include one or more user accounts. A user may desire to access the user account for accessing data and functions associated with the user account. Often, a user account can be accessed using a password. For instance, the user can be prompted for the password. If the password is incorrect, the user can be denied access to data and functions associated with the user account. In response to receiving the correct password, the user can be granted access to the data and functions associated with the account.

SUMMARY

In one example, a system can prevent access to a user account via a password-based mode of authentication. The system can receive a request from a non-digital authentication channel or a digital authentication channel to enable the password-based mode of authentication to enable one or more user devices to access the user account. The system can include a password-less mode of authentication that can provide the one or more user devices with password-less access to the user account. The non-digital authentication channel can include an in-network system at a physical location associated with an entity managing the user account. The request can include an authenticated credential associated with the physical location and a verification associated with the user of the user account. The system can confirm the verification and the authenticated credential received in the request. The system can, in response to confirming the verification and the authenticated credential, change a setting in a database associated with the user account to enable the password-based mode of authentication associated with the user account for providing the one or more user devices with password-based access to the user account.

DETAILED DESCRIPTION

Figure 1:
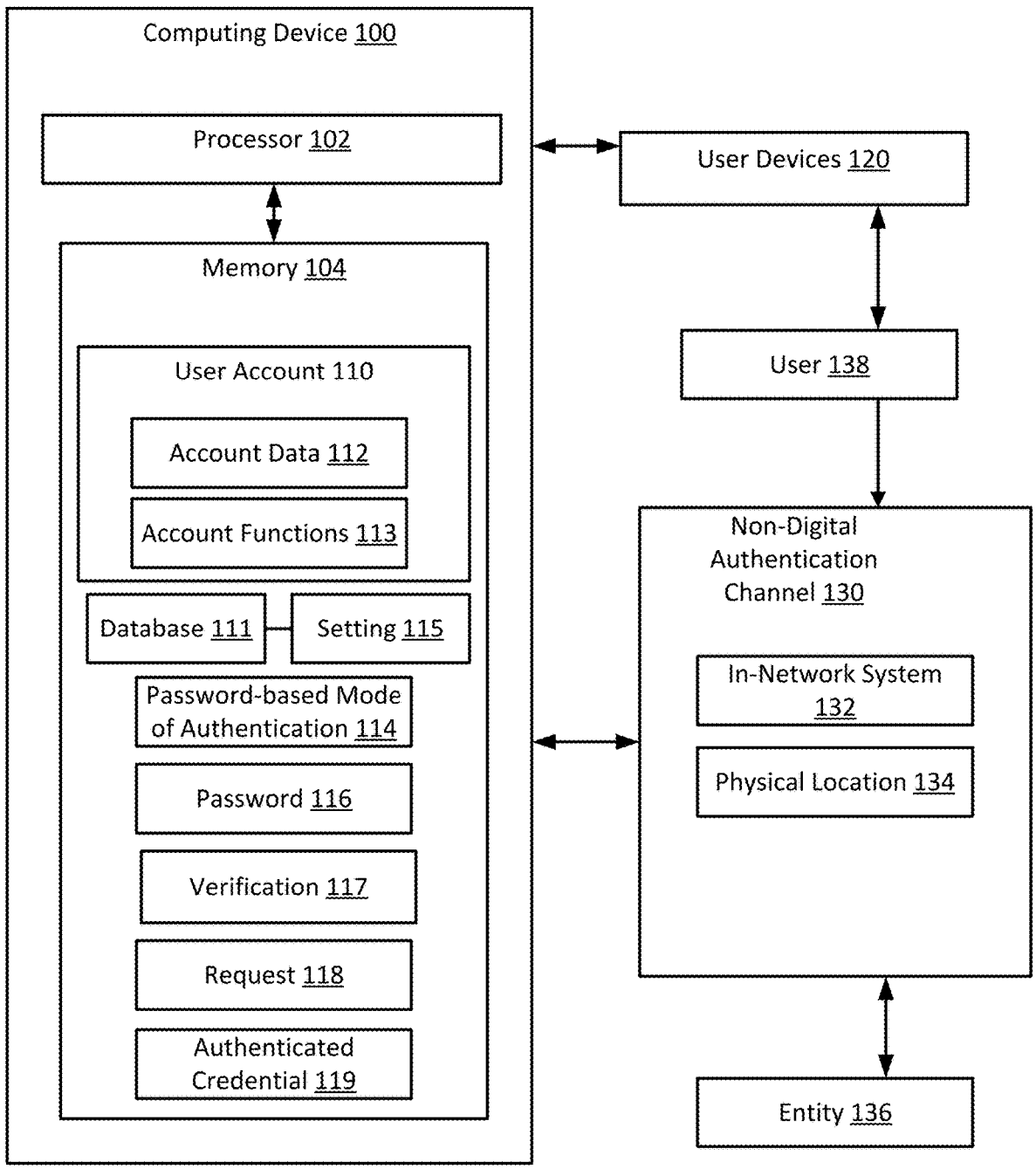
FIG. 1 is a schematic of a computing environment in which a computing device can enable a password-based mode of authentication in response to a request made through a non-digital authentication channel or a digital authentication channel according to some aspects of the disclosure.

Certain aspects and features relate to enabling a password-based mode of authentication associated with a user account in response to receiving a request from a non-digital authentication channel or a digital authentication channel. A password-based mode of authentication can involve prompting the user to enter a password. For example, if the password entered is correct, a computing device associated with the user account can grant the user access to the user account. Disabling the password-based mode of authentication can prevent the user from accessing the user account by entering the password. Enabling the password-based mode of authentication can enable the computing device to grant the user password-based access to the user account. The user can make a request to enable the password-based mode of authentication through a non-digital authentication channel or a digital authentication channel. The request can be associated with one specific user device or multiple user devices. The non-digital authentication channel can include an in-network system at a physical location associated with an entity that manages the user account. For example, the physical location may be a branch location and the entity may be a bank. The user can initiate the request by interacting with a representative of the entity in-person. The request can include an authenticated credential associated with the physical location and a verification associated with the user of the user account. For example, the verification can be a physical document, such as an identification card, a driver license, a passport, or a social security card. The computing device can receive the verification from the in-network system of the physical location. The computing device can confirm the verification and the authenticated credential. The computing device can use the verification to verify the identity of the user and the authenticity of the request prior to enabling the password-based mode of authentication. In some examples, each user account may correspond to one or more entries in a database. For example, the entries can be associated with a unique identifier, such as a string, that can correspond to the user account. For example, the one or more entries in the database corresponding to the user account can include a setting associated with the password-based mode of authentication, such as a Boolean flag or Boolean variable. Adjusting the value of the setting can determine whether the password-based mode of authentication is honored. Similarly, a password-less mode of authentication can include a different setting that can determine whether or not the password-less mode of authentication is honored. Once the computing device has confirmed the verification and the authenticated credential associated with the request, the computing device can change the setting in the database to provide the user with password-based access to the user account.

In some examples, the computing device can enable the password categorically for all devices associated with the user account, or the computing device can enable the password for a specific user device or set of user devices. Once the password has been enabled, the password may grant access to the user account. In some examples, the password-less mode of authentication can be compromised and can present security challenges. For example, a device associated with the password-less mode of authentication can be stolen. Malicious actors can commit fraudulent acts with the stolen device. In such examples, it can be desirable to enable the password-based mode of authentication and disable the password-based mode of authentication.

Furthermore, disabling a password-less mode of authentication and enabling a password-based mode of authentication associated with the user account can reduce a consumption of computing resources by the computing device associated with the user account. For example, enabling the password-based mode of authentication can provide faster access to account data associated with the user account by removing a delay associated with the password-less mode of authentication and by preventing the computing device from consuming resources due to processing data associated with the password-less mode of authentication.

In the following description, for the purposes of explanation, specific details are set forth to provide a thorough understanding of various implementations and examples. Various implementations can be practiced without these specific details. The figures and description are not intended to be restrictive.

FIG. 1 is a schematic of a computing environment in which a computing device 100 can enable a password-based mode of authentication 114 associated with a user account 110 via a non-digital authentication channel 130 or a digital authentication channel. The computing environment can include a computing device 100 that can be coupled to one or more user devices 120. The computing device 100 can include a server, such as a cloud computing server. The computing device 100 can be coupled to the user device 120 over a network, such as the Internet. Additionally or alternatively, the computing device 100 can be coupled to the one or more user devices 120 via a physical connection or local area network. The computing device 100 can include a memory 104 that can be a non-transitory computer-readable memory or a non-transitory computer-readable medium. The memory 104 can store instructions that can be executed by a processor in the computing device 100. The computing device 100 can include a processor 102 that can be communicatively coupled to a memory 104. The memory 104 can include instructions that can be executable by the processor 102 for causing the processor 102 to perform operations.

The processor 102 can include one processor or multiple processors. Non-limiting examples of the processor 102 include a Field-Programmable Gate Array (FPGA), an application-specific integrated circuit (ASIC), a microprocessor, etc. The processor 102 can execute instructions stored in the memory 104 to perform one or more operations. In some examples, the instructions can include processor-specific instructions generated by a compiler or an interpreter from code written in any suitable computer-programming language, such as C, C++, C#, etc.

In some examples, the computing device 100 can receive a request 118 to enable the password-based mode of authentication 114. The request 118 can be made by the a user 138 through a non-digital authentication channel 130. The non-digital authentication channel 130 can include an in-network system 132 at a physical location 134 associated with an entity 136 that manages the user account 110. For example, the physical location 134 may be a branch location and the entity 136 may be a bank. The user 138 can initiate the request 118 by interacting with a representative of the entity 136 in-person. In some examples, the computing device 100 can enable the user 138 to schedule an appointment for an in-person interaction with the representative for a specific time and date. For example, the representative can retrieve information from the user 138 during the in-person interaction. The representative can also enter details and upload documents associated with the request 118 to the in-network system 132. The in-network system 132 can transmit the request 118 to the computing device 100.

The request 118 to enable the password-based mode of authentication 114 can include an authenticated credential 119 associated with the physical location 134 and a verification 117 associated with the user 138 of the user account. For example, the verification 117 can be a physical document, such as an identification card, a driver license, a passport, or a social security card. In some examples, the verification 117 can include a physical authentication key that can be communicatively coupled with the in-network system 132. For example, the physical authentication key can be a USB stick that can communicate with the in-network system via a universal serial bus connection by mechanically engaging with a USB port associated with the in-network system 132. In some examples, the verification 117 can be an electronic copy of the physical document or information thereon that can be uploaded to the in-network system 132. The in-network system 132 can transmit the verification 117 to the computing device 100 electronically. For example, the in-network system 132 can issue a TCP or HTTP request to push the verification 117 to the computing device 100. The in-network system 132 can transmit the verification 117 to the computing device 100 through an encrypted or otherwise secured channel of communication. The computing device 100 can receive the verification 117 from the in-network system 132 of the physical location 134.

The authenticated credential 119 can include a certificate indicating the authenticity of the request 118. For example, the in-network system 132 can generate the authenticated credential 119 for associating the request 118 with the physical location 134. The computing device 100 can confirm the verification 117 and the authenticated credential 119. Additionally, the computing device 100 can transmit the verification 117 to a verification service for confirming the verification 117. The computing device 100 can receive a verification status of the verification 117. The computing device 100 can use the verification 117 to verify the identity of the user 138 and the authenticity of the request 118 prior to enabling the password-based mode of authentication 114. In some examples, the computing device 100 can transmit a push notification to each user device 120. The user 138 can interact with the push notification to provide further verification 117 for the request 118. For example, the push notification can request geospatial information from the user device 120. The computing device 100 can compare the geospatial information of the user device 120 with geospatial information associated with the physical location 134 for verifying the request 118.

In some examples, each user account 110 may correspond to one or more entries in a database 111. The database 111 can be a relational database or a non-relational database. For example, the entries can be associated with a unique identifier, such as a string, that can correspond to the user account. For example, the one or more entries in the database 111 corresponding to the user account 110 can include a setting 115 associated with the password-based mode of authentication 114, such as a Boolean flag or Boolean variable. Adjusting the value of the setting 115 can determine whether the password-based mode of authentication 114 is honored. Similarly, a password-less mode of authentication associated with the user account 110 can include a different setting 115 that can determine whether or not the password-less mode of authentication is honored. In some examples, enabling the password-based mode of authentication 114 can involve enabling a password-less mode of authentication that can be used in tandem with the password-based mode of authentication 114 as part of a multi-factor mode of authentication. Once the computing device 100 has confirmed the verification 117 and the authenticated credential 119 associated with the request 118, the computing device 100 can change the setting 115 in the database 111 to provide the user 138 with password-based access to the user account 110. For example, the computing device 100 can modify the Boolean flag or Boolean variable to store a value for granting the user 138 password-based access to account functions 113 that can be associated with the user account 110 and account data 112 that can be associated with the user account 110.

In some examples, the processor 102 can disable the password-based mode of authentication 114 by disabling a password 116. The password-less mode of authentication can include a biometric mode of authentication. For example, each user device 120 can be equipped with a biometric sensor, such as a fingerprint scanner. Additionally or alternatively, the user device 120 can a include a camera and facial recognition software. The user device 120 can use the biometric sensor to obtain biometric data from an individual. The computing device 100 or the user device 120 can determine whether the biometric data obtained from the biometric sensor corresponds to the user or not. If the biometric data corresponds to the user, the user can be granted access to the user account 110 and account data 112 and account functions 113 associated therewith.

In some examples, the password-less mode of authentication can include a QR-code-based mode of authentication. For example, the user can be issued a physical object with a QR code by an entity associated with the user account 110. The user device 120 can scan the QR code with a camera. The user device 120 can decode the QR code to determine a command. The user device 120 can issue the command to receive access to the user account 110 and account data 112 and account functions 113 associated therewith. The password-less mode of authentication can include an e-mail-based mode of authentication. For example, the computing device 100 can transmit an e-mail to an e-mail account associated with the user. In some examples, the e-mail can include a code. The user can be prompted to enter the code. Upon receiving the code, the system can permit the user with access to the user account 110, including account data 112 and account functions 113 associated therewith.

Additionally or alternatively, the password-less mode of authentication can include an SMS-based mode of authentication. For example, the user device 120 can transmit the request 118 to the computing device 100 to access the user account 110. The computing device 100 can transmit a first text message to the user device 120 requesting verification. The user device 120 can transmit a second text message to the computing device 100 to verify the request 118. In response to verifying the request 118, the computing device 100 can grant the user device 120 access to account data 112 associated with the user account 110 and account functions 113 associated with the user account 110.

The password-less mode of authentication can include a mobile-app-based mode of authentication. For example, the user device 120 can include a mobile app that can be associated with an entity that can access and alter the account data 112 and account functions 113 associated with the user account 110. In some examples, the user device 120 can generate the request 118 via interactive elements of the mobile app. The user device 120 can use interactive elements of the mobile app to verify the request 118. In response to the request 118, the computing device 100 can grant the user device 120 access to account data 112 associated with the user account 110 and account functions 113 associated with the user account 110. In some examples, the password-less mode of authentication can be a multi-factor mode of authentication that can combine several of the password-less modes of authentication described previously.

Figure 2:
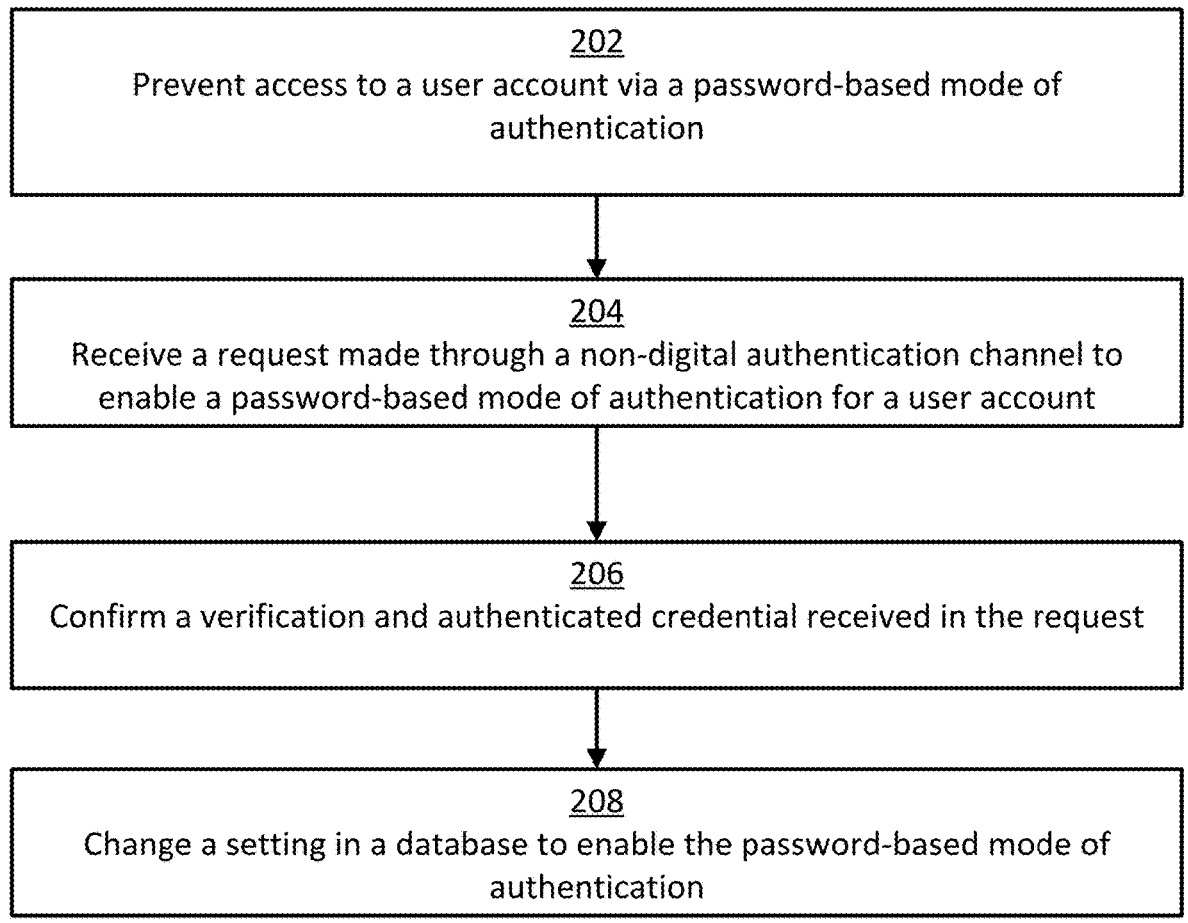
FIG. 2 is a flow chart of a process by which a computing device can enable a password-based mode of authentication in response to a request made through a non-digital authentication channel or a digital authentication channel according to some aspects of the disclosure.

FIG. 2 is a flow chart of a process by which a computing device can enable a password-based mode of authentication in response to a request made through a non-digital authentication channel or a digital authentication channel according to some aspects of the disclosure.

At block 202, the computing device can prevent access to a user account via a password-based mode of authentication. For example, the computing device can disable a password associated with the user account. Disabling the password can prevent a user from accessing account data associated with the user account and account functions associated with the user account by entering the password.

At block 204, the computing device can receive a request from a non-digital authentication channel or a digital authentication channel to enable the password-based mode of authentication to access the user account. For example, the non-digital authentication channel can include an in-network system at a physical location associated with an entity that manages the user account. For example, the physical location may be a branch location or a drive-through kiosk of a branch location. The user can initiate the request by interacting with a representative of the entity in-person.

The request can include an authenticated credential associated with the physical location and a verification associated with the user of the user account. For example, the verification can include a physical document, such as an identification card, a driver license, a passport, a social security card, or any combination thereof. In some examples, the verification can include a physical authentication key that can be communicatively coupled with the in-network system. For example, the physical authentication key can be a USB stick or other physical device that can communicate with the in-network system via a universal serial bus connection by mechanically engaging with a USB port associated with the in-network system. In some examples, the verification can be an electronic representation of the physical document or information thereon that can be uploaded to the in-network system. The in-network system can transmit the verification to the computing device over a network. For example, the in-network system can issue a TCP or HTTP request to push the verification to the computing device.

At block 206, the computing device can confirm the verification and the authenticated credential received in the request. For example, the computing device can transmit the verification to a verification service for confirming the verification. The verification service can include a server that can determine whether or not the verification is legitimate. The verification service can transmit a verification status of the verification to the computing device, the verification status indicating whether or not the computing device can accept the verification. The computing device can use the verification to verify the identity of the user and the authenticity of the request prior to enabling the password-based mode of authentication.

At block 208, the computing device can, in response to confirming the verification and the authenticated credential, change a setting in a database associated with the user account to enable the password-based mode of authentication and grant the user password-based access to the user account. For example, the setting can include a Boolean flag or Boolean variable. The value stored in the setting can determine whether the password-based mode of authentication 114 is honored. For example, the computing device may not honor the password and may deny the user password-based access if the setting stores a first value. Conversely, the computing device may honor the password and can grant the user password-based access if the setting stores a second value. The second value can be different than the first value.

Figure 3:
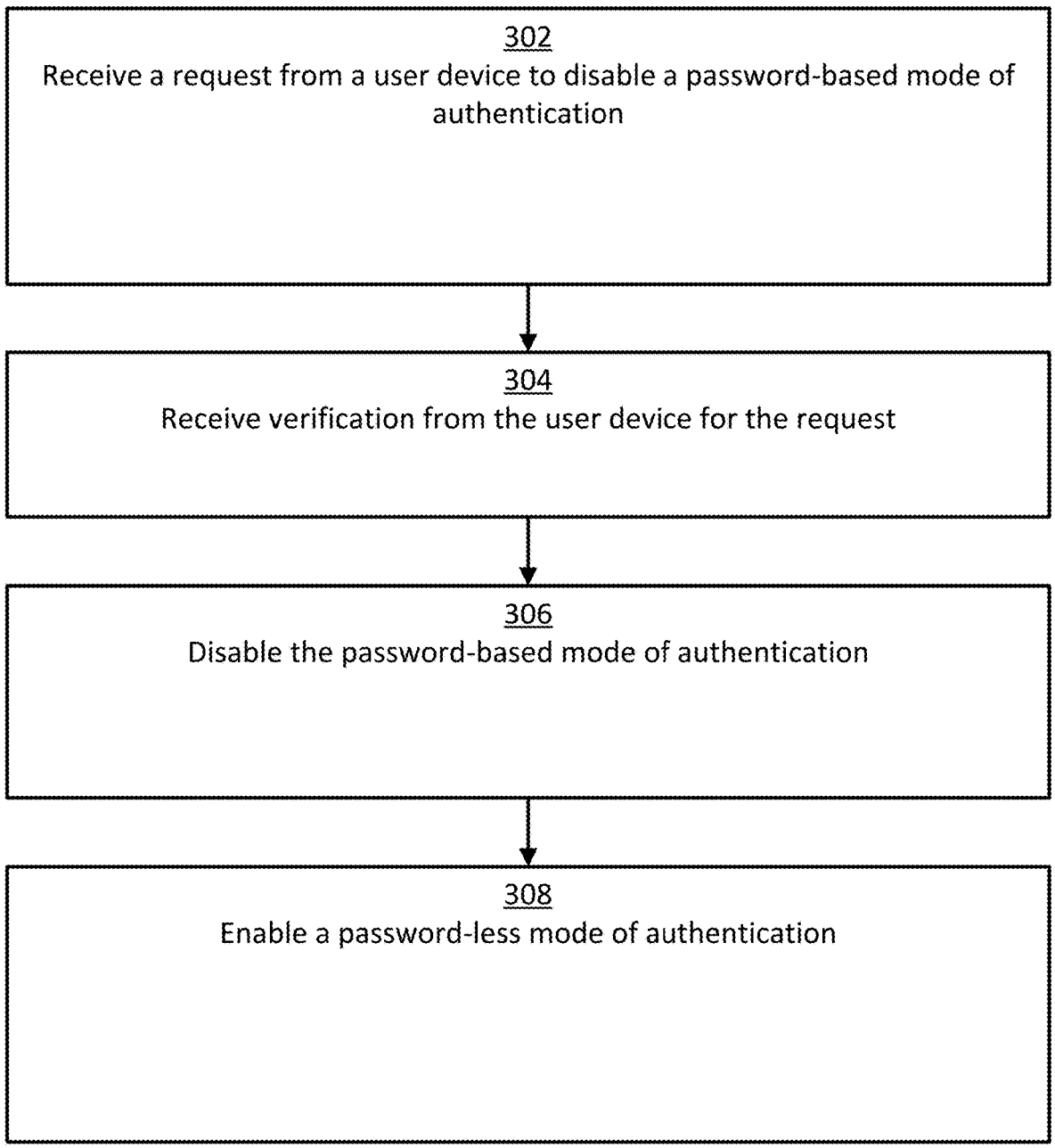
FIG. 3 is a flow chart of a process by which a computing device can disable a password-based mode of authentication and enable a password-less mode of authentication according to some aspects of the disclosure.

FIG. 3 is a flow chart of a process by which a computing device can disable a password-based mode of authentication and enable a password-less mode of authentication according to some aspects of the disclosure.

At block 302, the computing device can receive a request from a user device to disable a password-based mode of authentication associated with a user account. The user account can include a password corresponding to the password-based mode of authentication that can be used for accessing account data associated with the user account and account functions associated with the user account. The request may be a TCP or HTTP request. For example, the user device can include a browser or application that can generate the TCP or HTTP request and issue a command to transmit the request to the computing device, or to a server that may be communicatively coupled to the computing device. In some examples, the request can include a command to retrieve data from the computing device. For example, the computing device can include a database and the request can include a database command for retrieving one or more entries in the database. In response to receiving the request, the computing device may transmit a response to the user device for requesting verification from the user device.

At block 304, the computing device can receive verification from the user device for the request. In some examples, the user device can transmit a certificate that can include the verification to the computing device. The computing device can store the verification in local memory. In some examples, the verification can expire after one use or after an amount of time that can be determined by the computing device.

At block 306, the computing device can disable the password-based mode of authentication associated with the user account. Once the password-based mode of authentication has been disabled, the computing device may not honor requests to access the user account that are associated with the password until the password-based mode of authentication is re-enabled. The user can re-enable the password-based mode of authentication through a non-digital authentication channel. For example, the user can visit a physical location that can be associated with the entity that can manage the account data and account functions associated with the user account. The user can communicate in-person with a representative from the entity to request that the password-based mode of authentication be re-enabled. The representative can receive one or more physical forms of verification from the user, such as an identification card, a driver license, a passport, a social security card, or any other suitable form of verification. Based on the one or more physical forms of verification, the representative can issue a command to the computing device to re-enable the password-based mode of authentication.

At block 308, the computing device can enable a password-less mode of authentication associated with the user account. For example, the account data associated with the user account can include a flag or variable associated with each password-less mode of authentication available to the user account. The flag or variable can indicate which password-less mode(s) of authentication can verify requests to access the account data and account functions associated with the user account. The password-less mode of authentication can enable the user device to access account data associated with the user account and account functions associated with the user account without requiring the user to enter the password. The password-less mode of authentication can include a biometric mode of authentication, a QR-code-based mode of authentication, an e-mail-based mode of authentication, an SMS-based mode of authentication, a physical key-based mode of authentication, or a mobile-app-based mode of authentication.

The foregoing description of certain examples, including illustrated examples, has been presented only for the purpose of illustration and description and is not intended to be exhaustive or to limit the disclosure to the precise forms disclosed. Numerous modifications, adaptations, and uses thereof are possible without departing from the scope of the disclosure. For example, any example described herein can be combined with any other example to yield further examples.

What is claimed is:

1. A system comprising:
a processor; and
a non-transitory computer-readable memory having instructions stored thereon that are executable by the processor to cause the system to:
  determine, for at least one user device included in a set of user devices, that the at least one user device has compromised security;
  prevent access, via a password-based mode of authentication and in response to determining that the at least one user device has compromised security, to a user account by the set of user devices;
  receive a request from an in-network system at a physical location to enable the password-based mode of authentication to access the user account by the set of user devices, the in-network system at the physical location associated with a non-digital authentication channel and an entity managing the user account, the request including an authenticated credential associated with the physical location and a verification associated with a user of the user account;
  confirm the verification and the authenticated credential received in the request, wherein the authenticated credential is generatable by the system in response to confirming the verification, and wherein the verification comprises a digital version of a physical document and a physical authentication key providable by a separate memory store that is configured to be communicatively coupled with the system;
  in response to confirming the verification and the authenticated credential, change a setting in a database associated with the user account to enable the password-based mode of authentication associated with the user account for providing the at least one user device with password-based access to account data associated with the user account and account functions associated with the user account, the setting comprising a Boolean flag or a Boolean value for indicating whether the password-based mode of authentication is activated; and in response to confirming the verification and the authenticated credential, adjust a second setting in the database associated with the user account to enable a password-less mode of authentication associated with the user account for providing a subset of user devices with password-less access to account data associated with the user account and account functions associated with the user account, wherein the subset of user devices does not include the at least one user device.

2. The system of claim 1, wherein the physical document comprises at least one of: an identification card, a driver license, a passport, or a social security card.

3. The system of claim 1, wherein the instructions are further executable by the processor to cause the system to:
transmit the verification to a verification service for confirming the verification; and
receive a response from the verification service indicating a verification status of the verification.

4. The system of claim 1, wherein the instructions are further executable by the processor to cause the system to enable, based on the request made through the non-digital authentication channel, a multi-factor mode of authentication that comprises at least the password-based mode of authentication and a password-less mode of authentication.

5. The system of claim 1, wherein the instructions are further executable to cause the system to transmit a push notification to the user device, the push notification being usable for verifying the request made through the non-digital authentication channel.

6. The system of claim 1, wherein the verification comprises at least a physical authentication key that is communicatively couplable with the in-network system via a universal serial bus connection; and wherein the setting of the database comprises a Boolean variable that is configured to prevent the access to the user account via the password-based mode of authentication when the Boolean variable stores a first value, and wherein the setting is configured to grant access to the user account via the password-based mode of authentication when the Boolean variable stores a second value, the first value being different from the second value, and wherein the database is a relational database, and wherein the non-transitory computer-readable memory is further executable to cause the system to enable the user to schedule an appointment with a representative at the physical location associated with the entity managing the user account.

7. A method comprising:
determining, by a processor and for at least one user device included in a set of user devices, that the at least one user device has compromised security;
in response to determining that the at least one user device has compromised security, preventing access, by a processor and via a password-based mode of authentication, to a user account by the set of user devices;
receiving, by the processor, a request from an in-network system at a physical location to enable the password-based mode of authentication to access the user account by the set of user devices, the in-network system at the physical location associated with a non-digital authentication channel and an entity managing the user account, the request including an authenticated credential associated with the physical location and a verification associated with a user of the user account;
confirming, by the processor, the verification and the authenticated credential received in the request, wherein the authenticated credential is generated in response to confirming the verification, and wherein the verification comprises a digital version of a physical document and a physical authentication key provided by a separate memory store;
in response to confirming the verification and the authenticated credential, changing, by the processor, a setting in a database associated with the user account to enable the password-based mode of authentication associated with the user account for providing the at least one user device with password-based access to account data associated with the user account and account functions associated with the user account, the setting comprising a Boolean flag or a Boolean value for indicating whether the password-based mode of authentication is activated; and
in response to confirming the verification and the authenticated credential, adjust a second setting in the database associated with the user account to enable a password-less mode of authentication associated with the user account for providing a subset of user devices with password-less access to account data associated with the user account and account functions associated with the user account, wherein the subset of user devices does not include the at least one user device.

8. The method of claim 7, wherein the physical document comprises at least one of: an identification card, a driver license, a passport, or a social security card.

9. The method of claim 7, further comprising:
transmitting, by the processor, the verification to a verification service for confirming the verification; and
receiving, by the processor, a response from the verification service indicating a verification status of the verification.

10. The method of claim 7, further comprising enabling, by the processor and based on the request made through the non-digital authentication channel, a multi-factor mode of authentication that comprises at least the password-based mode of authentication and a password-less mode of authentication.

11. The method of claim 7, further comprising transmitting, by the processor, a push notification to the user device, the push notification being usable for verifying the request made through the non-digital authentication channel.

12. The method of claim 7, wherein the verification comprises at least a physical authentication key that is communicatively couplable with the in-network system via a universal serial bus connection; and wherein the setting of the database comprises a Boolean variable that is configured to prevent the access to the user account via the password-based mode of authentication when the Boolean variable stores a first value, and wherein the setting is configured to grant access to the user account via the password-based mode of authentication when the Boolean variable stores a second value, the first value being different from the second value, and wherein the database is a relational database, and wherein the method further comprises enabling, by the processor, the user to schedule an appointment with a representative at the physical location associated with the entity managing the user account.

13. A non-transitory computer-readable medium comprising instructions that are executable by a processor for causing the processor to:

determine, for at least one user device included in a set of user devices, that the at least one user device has compromised security;

prevent access, via a password-based mode of authentication and in response to determining that the at least one user device has compromised security, to a user account by the set of user devices;

receive a request from an in-network system at a physical location to enable the password-based mode of authentication to access the user account by the set of user devices, the in-network system at the physical location associated with a non-digital authentication channel and an entity managing the user account, the request including an authenticated credential associated with the physical location and a verification associated with a user of the user account;

confirm the verification and the authenticated credential received in the request, wherein the authenticated credential is generatable in response to confirming the verification, and wherein the verification comprises a digital version of a physical document and a physical authentication key providable by a separate memory store;

in response to confirming the verification and the authenticated credential, change a setting in a database associated with the user account to enable the password-based mode of authentication associated with the user account for providing the at least one user device with password-based access to account data associated with the user account and account functions associated with the user account, the setting comprising a Boolean flag or a Boolean value for indicating whether the password-based mode of authentication is activated; and in response to confirming the verification and the authenticated credential, adjust a second setting in the database associated with the user account to enable a password-less mode of authentication associated with the user account for providing a subset of user devices with password-less access to account data associated with the user account and account functions associated with the user account, wherein the subset of user devices does not include the at least one user device.

14. The non-transitory computer-readable medium of claim 13, wherein the physical document comprises at least one of an identification card, a driver license, a passport, or a social security card.

15. The non-transitory computer-readable medium of claim 13, wherein the setting in the database associated with the user account is configured to provide a plurality of user devices with password-based access to account data associated with the user account and account functions associated with the user account.

16. The non-transitory computer-readable medium of claim 13, wherein the non-transitory computer-readable medium is further executable by the processor to cause the processor to:

transmit the verification to a verification service for confirming the verification; and receive a response from the verification service indicating a verification status of the verification.

17. The non-transitory computer-readable medium of claim 13, wherein the instructions are further executable to cause the processor to enable, based on the request made through the non-digital authentication channel, a multi-factor mode of authentication that comprises at least the password-based mode of authentication and a password-less mode of authentication.

18. The non-transitory computer-readable medium of claim 13, wherein the verification comprises at least a physical authentication key that is communicatively couplable with the in-network system via a universal serial bus connection; and wherein the setting of the database comprises a Boolean variable that is configured to prevent the access to the user account via the password-based mode of authentication when the Boolean variable stores a first value, and wherein the setting is configured to grant access to the user account via the password-based mode of authentication when the Boolean variable stores a second value, the first value being different from the second value, and wherein the database is a relational database, and wherein the non-transitory computer-readable medium is further executable to cause the processor to enable the user to schedule an appointment with a representative at the physical location associated with the entity managing the user account.

\* \* \* \* \*